United States Patent [19]

Heeren

[11] 3,838,404

[45] Sept. 24, 1974

[54] RANDOM ACCESS MEMORY SYSTEM AND CELL

[75] Inventor: Richard H. Heeren, Palatine, Ill.

[73] Assignee: Teletype Corporation, Skokie, Ill.

[22] Filed: May 17, 1973

[21] Appl. No.: 361,377

[52] U.S. Cl. ........ 340/173 DR, 340/173 R, 330/144
[51] Int. Cl. ........................................... G11c 13/00
[58] Field of Search ................. 340/173 R, 173 DR; 330/144; 320/1

[56] References Cited

UNITED STATES PATENTS

| | | | |
|---|---|---|---|
| 3,533,089 | 10/1970 | Wahlstrom | 340/173 DR |
| 3,588,844 | 6/1971 | Christensen | 340/173 DR |

*Primary Examiner*—Terrell W. Fears
*Attorney, Agent, or Firm*—J. L. Landis

[57] ABSTRACT

In an array of memory cells having the cells in each column coupled together by one of a plurality of address buses, the ground reference potential for each cell is provided by coupling a storage capacitor in each cell to an adjacent address bus. Since only one address bus is addressed at any selected time, the adjacent address buses remain at ground potential so that coupling of the storage capacitors in each addressed cell to the adjacent, grounded address buses supplies the required reference ground for each addressed cell. Refreshing, or restoring of the charges on the storage capacitor in each memory cell is accomplished by a plurality of sense-refresh amplifiers. Each sense-refresh amplifier can be coupled to a selected cell capacitor in a row of memory cells, and includes a first pair of MOSFET devices cross-coupled in a flip-flop configuration. In one embodiment, single phase clock signals are applied to the first pair of MOSFET's through an ON biased second pair of MOSFET's. The clock signals thus applied synchronize the read, write, and refresh functions of the memory. Alternatively, single phase clock signals can be applied to a third pair of MOSFET's coupled in parallel with the first pair, or a clock pulse can be used to short a pair of circuit nodes during an initial time period to bring a pair of load capacitances to a desired, low initial potential. Data signals are applied to and read-out from only one side of the sense-refresh amplifier, and the sense-refresh amplifier also serves to invert the data stored in memory cells on the opposite side, and to re-invert the data on read out.

50 Claims, 7 Drawing Figures

RANDOM ACCESS MEMORY SYSTEM AND CELL

BACKGROUND OF THE INVENTION

1. Field of the Invention

This invention relates to a single device per bit metal-oxide-semiconductor-field-effect-transistor (MOSFET) memory and relates particularly to a sense-refresh amplifier circuit and to a single transistor MOSFET memory cell for use therein.

2. Description of the Prior Art

Random access MOSFET memories utilizing incremental charges to store information in an array of memory cells, each cell including one MOSFET device and one capacitance device, are known in the prior art. Each row of the array of memory cells may include a sense-refresh amplifier for sensing the presence of an information-bearing charge on an addressed memory cell within that row. Each sense-refresh amplifier also periodically refreshes the information stored as charges on memory cells within that row. This periodic refreshing of the charge on memory cells counteracts the tendency of the charge to gradually dissipate from the capacitance device within that cell.

Typically, each sense-refresh amplifier circuit requires a source of multiphase clock signals in order to properly perform the sensing and refreshing functions in synchronism with the remainder of the memory. In practice, these signals are provided by coupling each amplifier to a number of clock circuits.

Each of these clock circuits requires additional area on the surface of a silicon chip and consumes additional electrical power. The surface area devoted to these clock circuits detracts from area available for memory cells. Electrical power dissipated by the clock circuits generates undesirable heat and necessitates larger power supplies than would be required by a memory requiring only a single phase clock circuit.

The capacitance device located in each memory cell must be coupled to a reference ground potential. Generally in MOSFET memories the reference ground potential has been provided by connecting each of these capacitance devices to a ground bus. Alternatively, the ground reference has been established by coupling each capacitance device to the substrate upon which it is formed, thereby establishing a substrate ground.

Either of these two means of establishing the reference ground is undesirable since it significantly increases the surface area required by each memory cell. If ground buses are provided, additional area on the silicon chip surface must be provided to accommodate at least one ground bus for every two columns of memory cells. Similarly, if a substrate ground is used, each capacitance device requires an increased area on the chip surface in order to effectively couple the capacitance device to the substrate ground.

Thus, both of the known methods of establishing a reference ground result in an inefficient and costly consumption of chip surface area. The surface area required for the ground buses or for coupling each capacitance device to the substrate ground substantially limits the number of memory cells which can be placed on a chip of given area. Conversely, a memory of a given capacity will require more and/or larger chips than the optimum number as a result of the area which must be devoted to the reference ground. Clearly then, the known methods of providing the reference ground present major disadvantages with respect to efficient utilization of chip surface area, manufacturing cost, and undesirable complexity of the memory circuit.

SUMMARY OF THE INVENTION

A sense-refresh amplifier circuit embodying certain principles of the invention may include a pair of cross-coupled MOSFET's having their first controlled electrodes coupled to a ground potential and each having its second controlled electrode coupled to a control electrode of the remaining MOSFET. Each of the second controlled electrodes is also coupled to one of two ON biased MOSFET's which function as load devices for the pair of MOSFET's. Each of the second controlled electrodes is further coupled to first and second load capacitances, which may, for example, include the first and second halves of one input-output bus of a MOSFET random access memory. Single phase clock signals are applied to the second controlled electrodes of the pair of cross-coupled MOSFET's, and hence to the first and second halves of the input-output bus, through the two ON biased MOSFET load devices. The single phase clock signals thus applied regulate the sense and refresh cycles of the sense-refresh amplifier.

In an alternate embodiment, each of a second pair of MOSFET's have their controlled electrodes coupled in parallel with the controlled electrodes of the first pair of MOSFET's. Single phase clock signals are applied to the control electrodes of the second pair of MOSFET's and thereby regulate the sense and refresh cycles of sense-refresh amplifier.

A single MOSFET memory cell embodying certain other principles of the invention may include a MOSFET having its control electrode coupled to a column address bus and its first controlled electrode coupled to a row input-output bus. The second controlled electrode is coupled to one lead of a storage capacitor. The other lead of the storage capacitor is coupled to an adjacent column address bus. Since only one column address bus is energized at any particular time, the coupling to the adjacent column address bus provides a reference ground for the storage capacitor whenever the memory cell is being addressed.

BRIEF DESCRIPTION OF THE DRAWING

The present invention will be more readily understood by reference to the following detailed description, when considered in conjunction with the accompanying drawing wherein.

DETAILED DESCRIPTION

Figure 1:
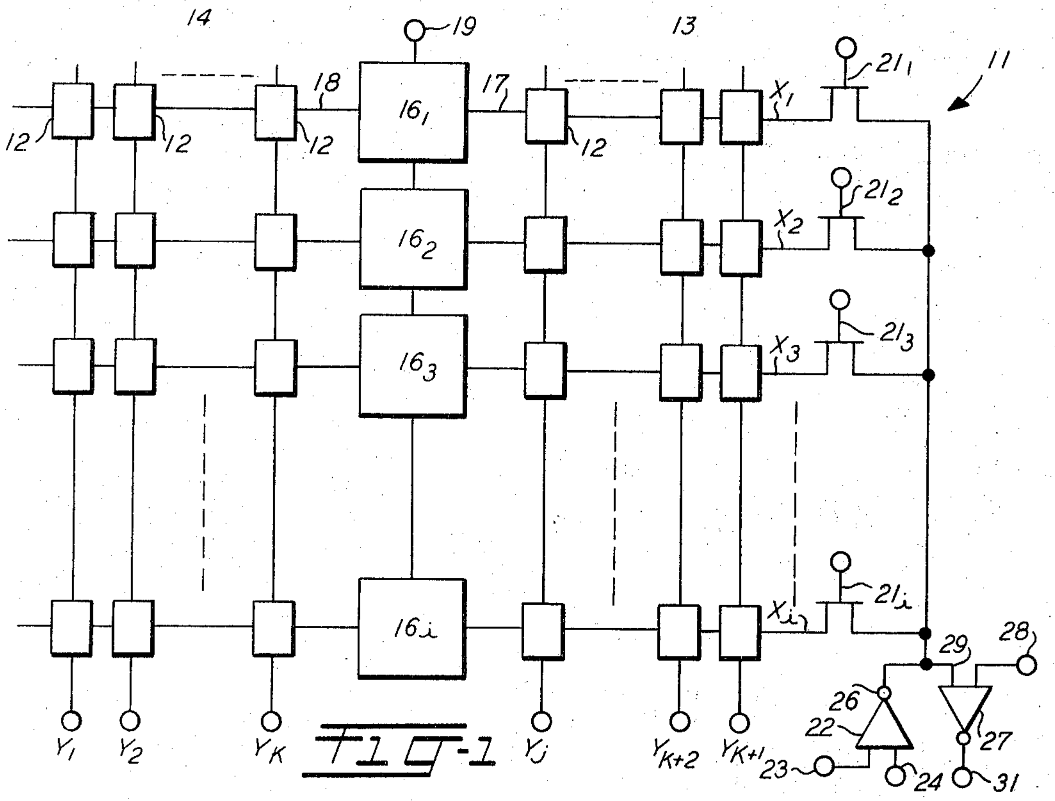
FIG. 1 is a block diagram of a portion of a memory arrangement incorporating principles of the invention.

Referring to FIG. 1, there is illustrated a block diagram of a portion of an overall arrangement of a memory indicated generally by the numeral 11, incorporating the principles of the invention. The memory 11 includes a plurality of memory cells 12 arranged in an orthogonal array. Each memory cell 12 represents a capability of the memory 11 to store one bit of information in the form of a binary 1 or 0.

The orthogonal array of the memory cells 12 is organized into a plurality of rows and columns. The memory cells 12 within each column are coupled together by a Y address bus, for example Y address bus $Y_1$. Each column may be identified with a specific Y address by reference to one of a plurality of Y address buses, $Y_1$ through $Y_j$.

As will be apparent from FIG. 1, the memory 11 is divided into a right bank or half 13 and a left bank or half 14, each bank having an equal number of the cells 12. The Y address buses $Y_1$ through $Y_k$ are located on the left and the Y address buses $Y_{k+1}$ through $Y_j$ on the right. Since $j$ $2k$, the number of columns on each side is equal. The two halves 13 and 14 of the memory 11 are separated by a plurality of sense-refresh amplifiers $\mathbf{16}_1$ through 16*i*.

The memory cells 12 within each row are coupled together by an input-output bus, for example input-output (I/O) bus $X_1$. Each row may be identified with a specific X address by reference to one of a plurality of I/O buses $X_1$ through $X_i$. Each I/O bus is divided into a right and left half, such as a right half 17 and a left half 18 of the I/O bus $X_1$. Both halves of each of the I/O buses $X_1$ through $x_i$ are coupled to one of the plurality of sense-refresh amplifiers $\mathbf{16}_1$ through $\mathbf{16}_i$. For example, both the halves 17 and 18 of the I/O bus $X_1$ are coupled to the sense-refresh amplifier $\mathbf{16}_1$. A clock signal input terminal 19 is coupled to each of the plurality of sense-refresh amplfiers $\mathbf{16}_1$ through $\mathbf{16}_i$.

Each of the plurality of I/O buses $X_1$ through $X_i$ is coupled to one of a plurality of transistors $\mathbf{21}_1$ through $\mathbf{21}_i$ which are coupled to decoder circuits (not shown). Each of the plurality of Y address buses $Y_1$ through $Y_j$ are also coupled to additional decoder circuits (not shown). The decoder circuits selectively drive the Y address buses and the plurality of transistors $\mathbf{21}_1$ to $\mathbf{21}_i$ to address each of the plurality of memory cells 12. Write functions for all of the rows are provided by a first amplifier 22 having a write input 23, and a data input 24, and an output terminal 26. The output terminal 26 is selectively coupled through each of the transistors $\mathbf{21}_1$ through $\mathbf{21}_i$ to each of the I/O buses $X_1$ through $X_i$ by decoder circuits. Similarly, a read output is provided for each of the I/O buses $X_1$ through $X_i$ by a second amplifier 27 having a read input 28, a data input 29 from the I/O buses, and an output terminal 31.

Associated with each of the halves 17 and 18 of the I/O bus $X_1$ is a distributed capacitance resulting from the inherent capacitance of the I/O bus $X_1$. These distributed capacitances of the halves 17 and 18 may be treated as discrete capacitors, as indicated by load capacitors 33 and 34 shown in phantom in FIG. 3. Significantly, the value of the load capacitor 33 associated with the right half 17 of the I/O bus $X_1$ is equal to the value of the load capacitor 34 associated with the left half 18. The effect of transistors $\mathbf{21}_1$ through $\mathbf{21}_i$ on the distributed capacitance of the right half 17 is balanced by a compensating circuit (not shown) coupled to the end of the left half of each of the I/O buses $X_1$ through $X_i$.

Figure 2:
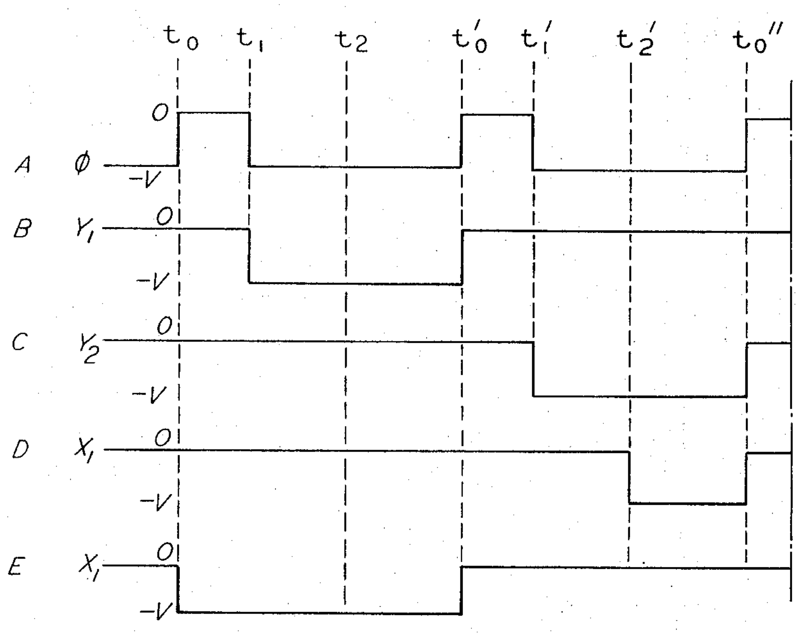
FIG. 2 is a graphical representation of the waveforms appearing at various points in the diagram of FIG. 1.

Referring to FIG. 2, there is shown a series of waveforms as they appear at various points in FIG. 1. FIG. 2 represents two cycles in the operation of the memory 11 of FIG. 1. The first cycle includes the time interval from $t=t_o$ to $t=_0'$ and the second cycle includes the interval from $t=t_o'$to $t=t_o''$. During these two cycles, only the first two Y address buses, $Y_1$ and $Y_2$, are addressed. A complete working cycle of the memory 11 would require numerous additional cycles of the Y address buses. However, two cycles involving only the Y address buses $Y_1$ and $Y_2$ are sufficient to illustrate the operation of the memory 11.

FIG. 2A represents a single phase clock or timing signal, $\phi$ which is applied to each of the sense-refresh amplifiers $\mathbf{16}_1$ through $\mathbf{16}_i$ (FIG. 1) by the clock input terminal 19 (FIG. 1). During the time intervals from $t_o$ to $t_1$ and from $t_o'$ to $t_1'$, $\phi$ is at potential of 0 volts. While $\phi = 0$ volts, the sense-refresh amplifier $\mathbf{16}_1$ discharges the load capacitors 33 and 34 (FIG. 3) to ground potential.

During the time intervals from $t_1$ to $t_o'$ and from $t_1'$ to $t_o''$ $\phi$ is at a potential of =V. The sense-refresh amplifier $\mathbf{16}_1$ sets an addressed memory cell 12 to the desired information storage level (0 or 1 ) if a write signal is simultaneously applied to the write input 23 during these time intervals. If a write signal is not applied, the sense-refresh amplifier $\mathbf{16}_1$ refreshes the memory cell 12 to maintain its current information storage level during these time intervals. The internal operation of the sense-refresh amplifier $\mathbf{16}_1$ will be explained in further detail below.

Referring to FIG. 2B, assume that the Y address bus $Y_1$ (FIG. 1) has been addressed by the decoder circuits (not shown) during the first cycle at time $t=t_1$. If it is desired to write information into the memory cell 12 associated with the I/O bus $X_1$ (FIG. 1) during the first cycle, a $-V$ potential is applied to turn ON the transistor $\mathbf{21}_1$ at time $t=t_o$ as shown in FIG. 2E. At the same time a write signal and the data to be entered on the memory cell 12 will be applied to the write input 23 (FIG. 1) and data input 24 (FIG. 1). A write signal at the write input 23 causes the first amplifier 22 to send the data signal to the transistors 21. Since the write signal is present on the I/O bus $X_1$ at a time when the sense-refresh amplifier $\mathbf{16}_1$ is setting the addressed memory cell 12, the data signal from the data input 24 will be set into the memory cell, as explained later.

Referring now to FIG. 2C, during the second cycle, at time $t=t_1'$, the Y address bus $Y_2$ (FIG. 1) is assumed to have been addressed by the decoder circuits (not shown). If it is desired to read information out of the memory cell 12 on the I/O bus $X_1$ (FIG. 1) during the second cycle, a $-V$ potential is applied to turn ON the transistor $\mathbf{21}_1$ at a time $t=t_2'$ as shown in FIG. 2D. At the same time a read signal is applied to the read input 28 (FIG. 1) which enables the second amplifier 27, and the information to be read out of the addressed memory cell 12 appears at the output terminal 31 (FIG. 1). The $-V$ potential is applied to the transistor $\mathbf{21}_1$ at time $t=t_2'$, subsequent to the refreshing of the information stored in the addressed memory cell 12. The read system will be explained in detail hereafter.

Figures 3, 4:
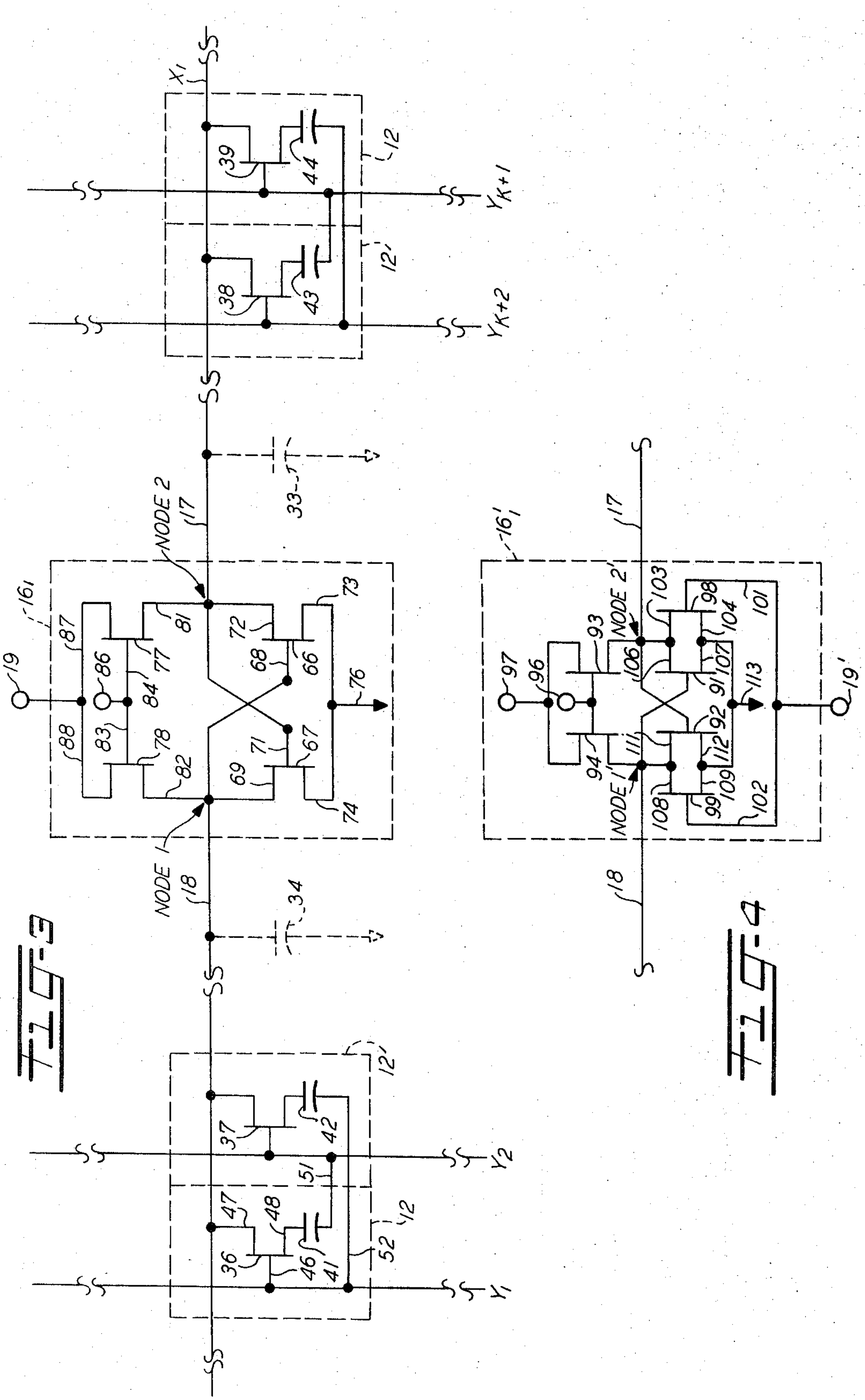
FIG. 3 is a schematic diagram of a sense-refresh amplifier in accordance with a first embodiment of the invention.
FIG. 4 is a schematic diagram of a second embodiment of the invention.

Referring to FIG. 3 there is shown a schematic diagram of the sense-refresh amplifier $16_1$ of FIG. 1. The sense-refresh amplifier $16_1$ is typical of each of the other amplifiers $16_1$ through $16_i$ shown in FIG. 1. For purposes of clarity, only four memory cells 12 are shown coupled to the sense-refresh amplifier $16_1$.

As illustrated in FIG. 3, the memory cells 12 associated with the Y address buses $Y_1$ and $Y_2$ and with the left half 18 of the I/O bus $X_1$ are coupled to node 1 on one side of the sense-refresh amplifier $16_1$. The memory cells 12 associated with the Y address buses $Y_{k+1}$ and $Y_{k+2}$ and with the right half 17 of the I/O bus $X_1$ are coupled to node 2 on the opposite side of the sense-refresh amplifier $16_1$.

Each of the memory cells 12 includes one transistor, such as transistors 36, 37, 38 and 39, and one storage capacitor such as storage capacitors 41, 42, 43 and 44.

The transistors 36, 37, 38 and 39 are desirably MOSFET devices, each having a control electrode, or gate, and a first and a second controlled electrode, or source and drain. For example, the transistor 36 has a gate 46 coupled to the Y address bus $Y_1$, a first controlled electrode 47 coupled to the left half 18 of the I/O bus $X_1$ and a second controlled electrode 48 coupled to a first electrode of the storage capacitor 41. It will be apparent from FIG. 3 that the remaining transistors 37, 38 and 39 are coupled to their respective Y address buses $Y_2$, $Y_{k+2}$ and $Y_{k+1}$, to the I/O bus $X_1$ and to their respective storage capacitors 42, 43 and 44 in an identical manner.

A second electrode of the storage capacitor 41, associated with the Y address bus $Y_1$, is coupled by a lead 51 to the adjacent Y address bus $Y_2$. Similarly, the second electrode of the storage capacitor 42, associated with the Y address bus $Y_2$, is coupled by a lead 52 to the adjacent Y address bus $Y_1$.

Thus, it will e apparent that the storage capacitors included in each of the memory cells 12 have their second electrodes coupled to an adjacent one of the Y address buses $Y_1$ through $Y_j$.

As described above, at any selected time only one of the Y address buses $Y_1$ through $Y_j$ is addressed by the decoder circuits (not shown). The remaining, non-addressed ones of the Y address buses $Y_1$ through $Y_j$ are at ground potential. Hence, when the Y address bus $Y_1$ is addressed, the adjacent Y address bus $Y_2$ will be at ground potential. Since the storage capacitor 41 is coupled to the Y address bus $Y_2$ by the lead 51, the ground potential present on the Y address bus $Y_2$ provides the required reference ground for the storage capacitor 41 when the Y address bus $Y_1$ is addressed. In an identical manner, the storage capacitor in each of the memory cells 12 has its second electrode coupled to an adjacent one of the Y address buses $Y_1$ through $Y_j$ thereby providing each of the storage capacitors with a reference ground.

By providing the reference ground for each of the memory cells 12 in the manner described above and illustrated in FIG. 3, a substantial savings in substrate area is realized when the memory cells 12 are produced in integrated circuit form. As shown in FIG. 3, the memory cells 12 may be formed immediately adjacent to each other without interposing a conventional ground bus between adjacent ones of the Y address buses $Y_1$ through $Y_j$. Thus, by utilizing an adjacent Y address bus to provide the reference ground for the memory cells 12 on any selected, addressed Y address bus, one ground bus for each pair of Y address buses can be eliminated. It will be apparent that this savings in surface area resulting from eliminating the conventional ground buses permits either a substantial reduction in the size of an integrated circuit memory array or a substantial increase in the number of memory cells which can be formed in an array of a particular size.

Figure 5:
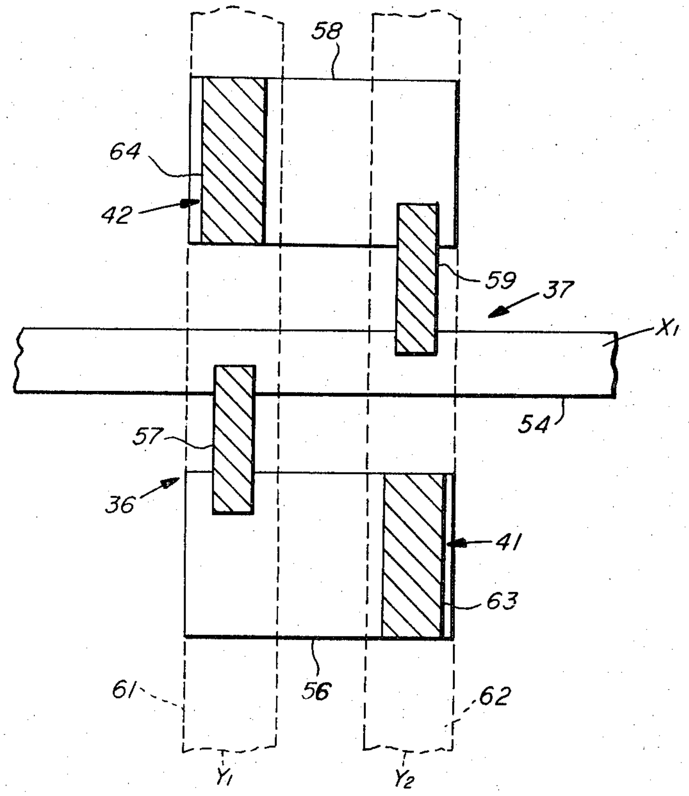
FIG. 5 illustrates a preferred topography of two of the memory cells of FIG. 3.

Referring to FIG. 5 there is illustrated a preferred topography for two of the memory cells 12 of FIG. 3. FIG. 5 illustrates the various layers of metal, oxide and semiconductor material as they would actually appear on a semiconductor substrate, forming two adjacent memory cells.

The left half 18 of the I/O bus $X_1$ is represented by a portion of a p-type diffusion region, designated by the numeral 54. The p-type diffusion regions shown in FIG. 5 are formed in one surface of an n-type substrate which underlies the entire circuit of FIG. 5. A p-type diffusion region 56 is shown adjacent to the diffusion region 54. A thin oxide region 57 extends between the diffusion regions 54 and 56 and forms the transistor 36 of FIG. 3. It will be understood that all regions in FIG. 5 which are not specifically noted as being thin oxide regions are covered with a thick oxide coating. This thick oxide coating separates the semiconductor material from all metal conductors and may be formed of, for example, silicon dioxide.

Similarly, another p-type diffusion region 58 is shown adjacent to the diffusion region 54. A thin oxide region 59 extends between the diffusion regions 54 and 58 and forms the transistor 37 of FIG. 3.

The Y address bus $Y_1$ (FIG. 3) is represented by a first metal conductor 61 (shown in dotted lines) which overlies the thin oixde region 57. The Y address bus $Y_2$ (FIG. 3) is similarly represented by a second metal conductor 62 (shown in dotted lines) which overlies the thin oxide region 59. As may be seen in FIG. 5 both the p-type diffusion regions 56 and 58 extend between the first and second metal conductors 61 and 62.

A thin oxide region 63 is formed between the diffusion region 56 and the overlying second metal conductor 62. The capacitive coupling through the thin oxide region 63 represents the storage capacitor 41 (FIG. 3). The coupling through the thin oxide layer 57 represents the coupling of the Y address bus $Y_1$ (FIG. 3) to the gate electrode 46 (FIG. 3) of the transistor 36 (FIG. 3).

Another thin oxide region 64 is formed between the diffusion region 58 and the overlying first metal conductor 61. The capacitive coupling through the thin oxide region 64 represents the storage capacitor 42 (FIG. 3).

The capacitance value of the storage capacitors 41 and 42 (FIG. 3) is determined by the thickness and surface area of the thin oxide regions 63 and 64, respectively.

The diffusion regions 56 and 58 and the thin oxide regions 63 and 64, respectively, serve to couple the transistors 36 and 37 and the storage capacitors 41 and 42, respectively, (FIG. 3) to their adjacent Y address buses $Y_2$ and $Y_1$ as shown in FIG. 3.

As described above, this coupling to adjacent Y address buses provides a suitable reference ground for the memory cells while requiring a minimum of surface area.

Thus, the topography of FIG. 5 represents one embodiment for the memory cells 12 of FIG. 3 which provides the reference ground for each of the memory cells by coupling each of the storage capacitors to an adjacent one of the Y address buses $Y_1$ through $Y_j$. By providing the reference ground in this manner a substantial surface area savings per memory cell is realized.

Referring again to FIG. 3, the sense-refresh amplifier $16_1$ includes a first transistor 66 and a second transistor 67 which are cross-coupled in a flip-flop circuit configuration.

The first transistor 66 has a gate or control electrode 68 which is cross-coupled to a first controlled electrode 69 of the second transistor 67 and is also coupled to the left half 18 of the I/O bus $X_1$ at node 1. Similarly, the second transistor 67 has a gate or control electrode 71 which is cross-coupled to a first controlled electrode 72 of the first transistor 66 and is also coupled to the right half 17 of the I/O bus $X_1$ at node 2.

Second controlled electrodes 73 and 74 of the first and second transistors 66 and 67, respectively, are coupled together and coupled to a ground conductor 76. The ground conductor 76 may be common to all the sense-refresh amplifiers $16_1$ through $16_i$ (FIG. 1).

Biasing voltages for the first and second transistors 66 and 67 are provided by third and fourth, or load, transistors 77 and 78, respectively, which have second controlled electrodes 81 and 82 that respectively couple to nodes 2 and 1. The third and fourth transistors 77 and 78 have gates 84 and 83, respectively, which are both coupled to a terminal 86. A constant DC voltage may be applied to the terminal 86 to continuously bias the load transistors 77 and 78 in the ON state. Thus, the load transistors 77 and 78 function as load resistors for the sense-refresh amplifier $16_1$.

First controlled electrodes 87 and 88 of the load transistors 77 and 78, respectively, are both coupled to the clock signal input terminal 19. Clock signals, such as those represented by the single phase clock signal $\phi$ shown in FIG. 2A, may be applied to the clock signal input terminal 19 to control the operation and timing of the sense-refresh amplifier $16_1$.

Referring to FIG. 4, there is shown an alternate embodiment of a sense-refresh amplifier $16_1'$ which may be used in the memory 11 of FIG. 1. The sense-refresh amplifier $16_1'$ includes a first and second transistors 91 and 92 which are cross-coupled to nodes 1' and 2' in a manner identical to that described for the sense-refresh amplifier $16_1$ of FIG. 3.

Third and fourth, or load, transistors 93 and 94 are also coupled to the nodes 1' and 2' and to terminals 96 and 97 in the same manner as described for the load transistors 77 and 78 and the terminals 86 and 19 of FIG. 3. A first constant DC voltage may be applied to the terminal 96 to bias the load transistors 93 and 94 in the ON state. A second constant DC voltage, which may be equal to the first constant DC voltage, may be applied to the terminal 97 to apply a biasing voltage through the load transistors 93 and 94 to the first and second transistors 91 and 92. If the first and second constant DC voltages are equal, the terminals 97 and 96 can be the same terminal.

Clock or timing signals are coupled to the first and second transistors 91 and 92 through fifth and sixth transistors 98 and 99 respectively. Gates 101 and 102 of the fifth and sixth transistors 98 and 99 are both coupled to a clock signal input terminal 19'.

As shown in FIG. 4, first and second controlled electrodes 103 and 104 of the fifth transistor 98 are respectively coupled to first and second controlled electrodes 106 and 107 of the third transistor 91. Similarly, first and second controlled electrodes 108 and 109 of the sixth transistor 99 are respectively coupled to first and second controlled electrodes 111 and 112 of the fourth transistor 92. The second controlled electrodes 104 and 107, and 109 and 112 are all coupled to a ground conductor 113.

Operation of the sense-refresh amplifier $16_1'$ is identical to that of the sense-refresh amplifier $16_1$ (FIG. 3). The clock signal applied to the clock signal input terminal 19', however, must be the inverse of the clock signal applied to the clock signal input terminal 19 (FIG. 3). Thus, the clock signal $\phi$, shown in FIG. 2A must be inverted before it is applied to the clock signal input terminal 19'.

Further, the current amplitudes of the clock signal $\phi$ (FIG. 2A) applied to the terminal 19' can be much less than the current amplitudes of the clock signal $\phi$ required at the terminal 19 (FIG. 3). Since the clock signal $\phi$ drives the gates 101 and 102 of the fifth and sixth transistors 98 and 99, less clock signal power is required than in the sense-refresh amplifiter $16_1$ where the clock signal drives the first controlled electrodes 87 and 88 of the third and fourth transistors 77 and 78.

Referring again to FIG. 3, in operation, each refresh cycle of the sense-refresh amplifier 16 is initiated by applying the clock signal $\phi$ (FIG. 2A) to the clock signal input terminal 19 at time $t=t_o$. At time $t=t_o$, the clock signal $\phi$ is at ground potential, or 0 volts. This 0 volt potential is applied through the third and fourth, or load, transistors 77 and 78 to the nodes 1 and 2.

The load capacitors 33 and 34 which are coupled, respectively, to the right and left halves 17 and 18 of the I/O bus $X_1$ and to the gates 68 and 71 of the first and second transistors 66 and 67, are discharged through nodes 1 and 2 by the ground potential applied to the clock signal input terminal 19.

After the load capacitors 33 and 34 have had sufficient time to discharge to ground potential, the clock signal $\phi$ (FIG. 2A) returns at time $t=t_1$ to a potential of $-V$ volts, for example $-12$ volts. When the clock signal $\phi$ returns to $-V$ volts the load capacitors 33 and 34 begin charging through the load transistors 77 and 78, respectively.

At the same time, $t=t_1$, one of the Y address buses $Y_1$ through $Y_j$ is addressed by the decoder circuits (not shown). For example, at time $t=t_1$ the Y address bus $Y_1$ may be addressed by applying a potential of $-V$ volts thereto (FIG. 2B). Since the gate 46 of the transistor 36 in the memory cell 12 is coupled to the Y address bus $Y_1$, application of the $-V$ potential to the Y address bus $Y_1$ switches the transistor 36 ON. Similarly, all of the transistors in the memory cells 12 having their gates coupled to the Y address bus $Y_1$ will be switched ON, such that all cells 12 in the selected Y column will be refreshed at the same time, corresponding to the time $t_1$ to $t_2$ in FIG. 2.

When the transistor 36 is switched ON, the storage or memory capacitor 41 is coupled through the transistor 36 to the left half 18 of the I/O bus $X_1$, which effectively is an isolated circuit, and thus to node 1. The storage capacitor 41 is thereby coupled in parallel with the load capacitor 34.

If the storage capacitor such as 41 in the left bank or side 18 of the circuit is at substantially ground potential at the time $t_1$, this represents the previous storage of a binary 1 as will be explained in the following section of this application. In that case, at time $t_1$, the load capacitor 34 will begin to charge toward the −V potential of the negative clock pulse $\phi$, but will charge at a slower rate than will the load capacitor 33, due to the combined capacitance of the storage capacitor 41 and the load capacitor 34 being larger than the capacitance of only the load capacitor 33.

Since the load capacitor 33 charges at a faster rate than the load capacitor 34, the gate 71 of the second transistor 67 will reach its threshold voltage, the voltage required to switch the transistor ON, first. After the second transistor 67 is switched ON, the feedback associated with the flip-flop type circuit of the sense-refresh amplifier $16_1$ holds the first transistor 66 OFF. IN particular, the load capacitor 34 associated with the memory cell 12 which has been addressed is discharged to ground potential through the now ON transistor 67, and the selected storage capacitor 41 also returns to ground potential between times $t_1$ and $t_2$, thus "refreshing" the 0 volt charge originally present on that capacitor. Charging of the load capacitor 33 from the negative $\phi$ clock pulse continues until the load capacitor is charged to a potential of −V volts, which charge is utilized after time $t_2$ in read out if the selected cell 12 is connected to the read amplifier 27, as will be explained hereafter.

At the time $t_o'$, the clock pulse $\phi$ returns to ground and the load capacitor 33 is discharged to the ground of the clock pulse, as previously described, during the first portion of the following cycle, such as $t_o'$ to $t_1'$. Also at $t_o'$, the previously selected Y address bus, such as $Y_1$, is de-energized, which turns off the selected transistor 36 and thus isolates the charge (ground) on the selected storage capacitor 41 for use in a later cycle.

If the storage capacitor 41 in the addressed memory cell 12 had previously been charged to a substantial negative voltage (representing the storage of a binary 0 as will be explained), the load capacitor 34 will be charged after time $t_1$ faster than the load capacitor 33 in this case since the load capacitor 34 is charged from the clock pulse $\phi$ through the load transistor 78, and also from the charged storage capacitor 41 after the selected $Y_1$ transistor 36 turns ON.

Thus, the load capacitor 34 will be charged to the threshold voltage of the first transistor 66, and will switch the first transistor ON before the second transistor 67 reaches its theshold voltage. With the first transistor 66 ON and the second transistor 67 OFF, the load capacitor 34 and the storage capacitor 41 continue to charge from the clock pulse $\phi$ while the opposite load capacitor 33 is discharged to ground level by the now ON transistor 66.

When a time corresponding to $t_2$ has been reached, the storage capacitor 41 has been fully charged, or recharged, to a potential $-V_M$, representing a predetermined portion of the clock voltage applied through the load transistor 78 to the capacitor 41 in parallel with the load capacitor 34.

This charge $-V_M$ represents the desired level for storing a binary 0 in a cell 12 on the left side 18 of the circuit. This recharging to $-V_M$ restores the desired data charge on the capacitor such as 41 during each refresh cycle, thus compensating for any charge leakage which may have occurred since the charge, or data, was entered, or since a previous refresh cycle.

At the time corresponding to $t_o'$, at the start of the next cycle, the clock pulse $\phi$ returns to ground, thus grounding the load capacitor 34, and the selected Y lead such as $Y_1$ is de-energized, thus isolating the data charge $-V_M$ on the capacitor 41 until a following cycle.

During subsequent cycles of the clock signal $\phi$, the data stored in each of the memory cells 12 in the memory 11 is refreshed by one of the plurality of sense-refresh amplifiers $16_1$ through $16_i$, when its corresponding Y address bus $Y_1$ to $Y_j$ is selected for energization in an address pattern or cycle desired. The storage capacitors such as 43, 44 on the right side 17 of the circuit are refreshed in exactly the same manner when the corresponding Y lead $Y_{k+1}$ to $Y_j$ is selected, except that on this side, a $-V_M$ charge indicates binary 1 and 0 volts indicates binary 0 as is the conventional description in this system of logic.

Write System

Considering now the writing process in more detail, the X- and Y- decoders (not shown) select a particular cross-point in the X–Y memory matrix; for example, the transistor 36 and capacitor 41 for the combination of the $X_1$ I/O bus and the $Y_1$ address bus. In the example illustrated at the left of FIG. 2 (time $t_o$ to $t'_o$), it is required to write a 1 at the crosspoint $X_1$, $Y_1$. As previously explained, in this case, the X-decoder turns ON the $X_1$ input gating transistor $21_1$ at time $t_o$, and a "write" input is applied at the terminal 23 of the write amplifier 22, thus connecting the data input 24 to the $X_1$ bus and to node 2 of the sense-refresh amplifier $16_1$. If a 1 is to be stored on the $X_1$, $Y_1$ capacitor 41 in the example circuit illustrated in FIG. 3, a −V data input signal is applied at the data input terminal 24 at time $t_o$, thus driving the right half of the $X_1$ bus and node 2 negative as shown in the left portion of FIG. 2E.

From time $t_o$ to $t_1$, this negative data input is gated to the ground of the clock pulse $\phi$ through the load transistor 77. At time $t_1$, the clock pulse $\phi$ goes negative, and the combination of the clock pulse signal and the input data signal (both negative voltages) quickly charges the load capacitor 33 to a value exceeding the threshold voltage of the transistor 67 so as to turn that transistor ON.

At the time $t_1$, the $X_1$, $Y_1$ transistor 36 also turns ON to connect the storage or memory capacitor 41 to node 1 and the clock pulse $\phi$ through the left load transistor 78, as previously explained in the description of the sense-refresh amplifier circuit. However, even if the capacitor 41 has been storing a −V charge from previous writing and refresh cycles, of the combination of the capacitor 41 and the clock pulse $\phi$ does not charge the left load capacitor 34 as fast as the combination of the clock pulse and the input data signal charges the right load capacitor 33, thus the left transistor 67 invariably turns ON first when a negative write signal is applied at the data input terminal 24, regardless of the previous state of the memory capacitor 41. In this way, a fresh data input signal during a write cycle effectively obliterates the previous data-related charge on the capacitor 41.

As previously explained, once the left transistor 67 turns ON (rather than the right transistor 66), the transistor 66 cannot turn ON and the capacitors 41 and 34 discharge to ground 76 through the left transistor 67. Thus, at the end of this writing cycle (tine $t'_o$), the memory capacitor 41 is essentially uncharged, which in the example of FIG. 3 represents storage of a binary 1 at the crosspoint $X_1$, $Y_1$. Thus, it should be appreciated that the sense-refresh amplifier 16, effectively inverts the input data signal stored in any cell 12 to the left of the amplifier $16_1$ such that an input binary 1 signal (—V) is stored on the left bank capacitors, such as 41, as O volts. As will be explained later, during read out, the amplifier $16_1$ again inverts the signal on the capacitor 41, such that a minus voltage, or 1, appears at the output terminal 31.

When a 0 is to be stored on a left bank capacitor such as 41 during a writing cycle, a 0 or ground potential is applied to the data input terminal 24 and connected to node 2 through the transistor $21_1$ from a time corresponding to $t_o$ for a full cycle of the clock signal $\phi$. In this case, at a time corresponding to $t_1$, when the clock pulse goes negative and a selected Y transistor such as 36 turns ON, the clock signal $\phi$ at the right of the amplifier $16_1$ is grounded to the 0 volt data signal at terminal 24. Thus, the right load capacitor 33 does not charge sufficiently to turn ON the left transistor 67, and the clock pulse charges the capacitors 34 and 41 in parallel until the right transistor 66 turns ON, after which the memory capacitor 41 continues to charge for the remainder of the cycle to a given fraction of the clock voltage, $-V_M$, which represents storage of a binary 0 in any of the left bank memory cells 12. Thus, the memory capacitor such as 41 charges fully to store a minus voltage regardless of its previous state when a 0 input is applied to the write input terminal 24 during a writing cycle, and the 0 input data signal is also inverted by the amplifier circuit $16_1$.

When storing data signals on the right bank capacitors, such as 43 and 44, a charge corresponding to the input data signal is stored, rather than the complement. For example, if a 1 is to be stored on the capacitor 44 at the $X_1$, $Y_{k+1}$ crosspoint, a —V data input is applied to node 2 as previously described. At a time corresponding to $t_1$, $\phi$ goes negative and the combination of the clock voltage and applied negative data signal turns the left transistor 67 ON before the right transistor 66 can turn ON, regardless of the previous state of the memory capacitor 44. Thus, the capacitor 44 is free to charge fully through the transistor 39 during the remainder of the cycle, to store a — voltage indicating a binary 1 .

If a binary 0 is to be stored on the capacitor 44, a ground input is applied to node 2 and the left transistor 67 cannot turn ON. Instead the right transistor 66 is selected, which further serves to ground the capacitor 44 when the selected Y transistor 39 turns ON, at a time corresponding to $t_1$. Thus, the capacitor 44 stores essentially zero volts, or a binary 0 at the end of the writing cycle, regardless of its previous state.

In this manner, the sense-refresh amplifiers, such as $16_1$, "set" the addressed memory cell 12 in accordance with the data input at 24 during each write cycle by charging or discharging the memory capacitors such as 41 to 44, regardless of their previous states, while inverting the data stored in the left half 14 of the array.

Read System

To read out the data stored on a selected one of the memory capacitors, such as 41 to 44, the state of the load capacitor 33 is effectively sampled after the refresh portion of the cycle has been completed, as from time $t_2'$ to $t'_o$ in the example previously discussed in connection with FIGS. 2C and 2D. In that example, the $Y_2$ address bus is energized at time $t'_1$ (FIG. 2C) and the charge stored on the memory capacitor 42 of the $Y_2$, $X_1$ cell 12 is refreshed during the time $t'_1$ to $t'_2$ as previously described, either to store a preset charge $-V_M$ from the clock pulse representing a binary 0, or to be effectively grounded through the transistor 67, representing binary 1. In both cases, the load capacitor 33 at the time $t'_2$ stores a voltage inverse to that of the memory capacitor 42 as described in connection with the refresh operation.

At the time $t'_2$, on read out, the selected X-gating transistor 21 is turned ON, such as transistor $21_1$ for the bus $X_1$ (FIG. 2D). This connects the $X_1$ bus to the input 29 of the read amplifier 27, as previously described, and when a "read" signal is also applied to the terminal 28 of that amplifier, the output signal at the terminal 31 represents the signal then stored on the load capacitor 33, which in turn represents the complement of the signal stored on the selected $X_1$, $Y_2$ crosspoint memory capacitor 42.

Thus, an inverted data signal stored on a left bank capacitor such as 42, as described in the previous sections, is effectively reinverted by the sense-refresh amplifier 16 on read out, in that the signal on node 2 (capacitor 33) at the end of the refresh portion of the cycle is the complement of the signal stored on the memory capacitor 42.

When a right bank memory cell 12 is to be read, for example capacitor 44 associated with the $Y_{k+1}$, $X_1$ crosspoint, the charge on the capacitor 44 at the end of the refresh portion of the cycle (corresponding to time $t'_2$) is of the same sense as that on the load capacitor 33, as previously described. That is, both are effectively grounded through transistor 66 when a 0 has been stored, or both are charged negative from the clock pulse $\phi$ when a 1 has been stored (transistor 67 is ON instead of transistor 66). In this case, when the transistor $21_1$ is turned ON at a time corresponding to $t'_2$ to read, the output signal at terminal 31 represents the combination of the charges on the load capacitor 33 and the selected memory capacitor 44, which as explained above are either both 0 volts for binary 0, or both a minus voltage for binary 1.

After reading, in all cases, at the next time corresponding to $t_o$, the previously selected column transistor such as 36–39 turns OFF to isolate and preserve the signal stored on the corresponding memory capacitor 41–44, and the clock pulse $\phi$ returns to ground so as to discharge to the $\phi$ pulse ground whichever load capacitor 33 or 34 had been charged in the previous cycle.

During each read cycle, all memory capacitors in the selected column $Y_1 \ldots Y_j$ are refreshed, although only the capacitor at the selected X crosspoint is read after the refresh portion of the cycle. On writing, all memory capacitors in the selected column are also refreshed, except for the one at the selected X crosspoint where fresh data is entered as previously described.

THIRD EMBODIMENT

Figure 6:
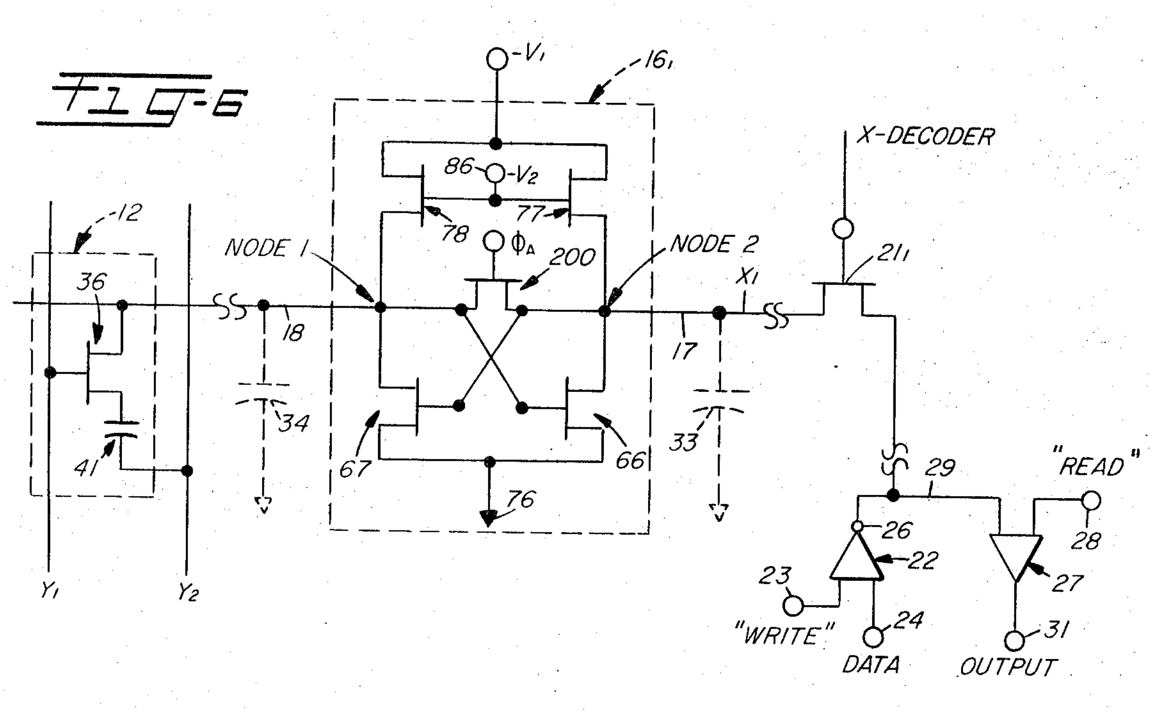
FIG. 6 is a circuit diagram of a third embodiment of the invention.
Figure 7:
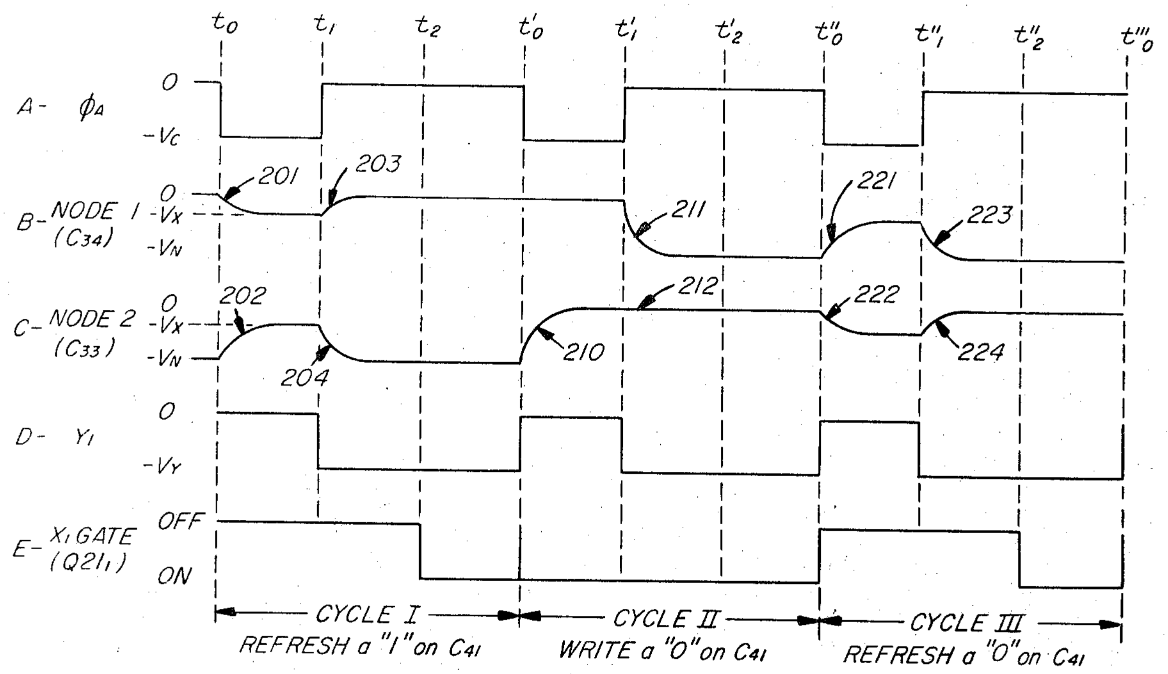
FIG. 7 is a timing diagram for the third embodiment.

Referring now to FIG. 6, a third embodiment of the system is illustrated. The structure is exactly the same as in FIG. 3, except for the addition of a shorting transistor 200 having its gate connected to a different source of clock pulses, $\phi_A$, and an external constant voltage source of charging potential $-V_1$ connected to the load transistors 77 and 78 as shown. FIG. 6 is otherwise the same as the corresponding portions of FIG. 3, with the same numerals, through 86, used to designate corresponding parts. Typical timing and charge/discharge cycles for the FIG. 6 circuit are depicted in FIG. 7.

To explain the differences in terms of operation, consider first the example previously described where the $Y_1$ address bus is selected, and is energized at time $t_1$ to turn ON the cell transistor 36 so as to connect the selected memory capacitor 41 to the left half 18 of the I/O bus $X_1$, and thus to the left node 1 of the sense-refresh amplifier $16_1$. As previously explained, the memory capacitor 41 is thus connected between the ground of the de-energized, companion $Y_2$ lead and node 1, in parallel with the left load capacitance 34.

Prior to $t_1$, however, the sense-refresh amplifier $16_1$ in the third embodiment is primed for operation in a different manner than previously described. In this embodiment, at time $t_o$ (FIG. 7), the clock pulse $\phi_A$ goes negative, which turns ON the shorting transistor 200 and thereby connects nodes 1 and 2 together from $t_o$ to $t_1$. Assuming as a first example the case where node 1, or the left load capacitance 34, had been at O volts representing a binary 1 in the previous cycle (recall that the stored data is inverted by the amplifier $16_1$ on the left side of the system), the charges on the load capacitances 34 and 33 at time $t_o$, in this example, are depicted in FIGS. 7B and C. In this example, the left load capacitance 34 is at essentially ground voltage and the right load capacitance 33 at $-V_N$, representng the full node charge from the charging source $-V_1$ (in FIG. 6) at the end of a full cycle.

In a typical example, the source of charging potential $-V_1$ is $-12$ volts, and $-V_N$ is of the order of $-12$ volts. The charge $V_N$ is applied, in this case, from the constant voltage source $-V_1$ through the right load transistor 77, which is perpetually ON, as explained in connection with the previous example, from a potential source $-V_2$, and as is commonplace $-V_2$ may be the same source as $-V_1$. As in the previous embodiments, the left flip-flop transistor 67 has been turned ON in this case, and the left load capacitance 34 discharges through the transistor 67 to circuit ground 76. As in the previous example, load transistors 77 and 78 function merely as load resistors connecting the charging source $-V_1$ to the respective nodes 2 and 1.

In the FIG. 6 embodiment, at time $t_o$, when the shorting transistor 200 turns ON to connect node 1 to node 2, the potential on the two nodes rapidly equalizes in that the right load capacitance 33 shares its charge with the left load capacitance 34. This is depicted by the converging waveforms 201 and 202 in FIGS. 7B and C, between times $t_o$ and $t_1$. (Of course the converse occurs when the left load capacitance 34 was the one previously charged, so that by the time $t_1$ is reached, the charges on capacitances 33 and 34 are the same, regardless of which one was previously charged.)

As the charges so equalize between $t_o$ and $t_1$, the circuit parameters ($-V_1$, the characteristics of transistors 77, 78, 66 and 67, and capacitances 33, 34) are preferably so chosen that the formerly OFF transistor 66 turns partially ON and the conduction of the formerly ON transistor 67 reduces so that it also is partially ON. Thus, the transistors 66 and 67 in effect become resistors before time $t_1$, conducting a portion of the source charge from $-V_1$ to ground 76, while establishing a preset initial charge $-V_X$ on both load capacitances 33 and 34. In the example previously given, the equalized initial charge $V_X$ is of the order of $-3$ volts, which is set so as to be slightly more negative than the threshold voltage of the transistors 66 and 67, in which case they are much more resistive than with $-V_N$ on their gate electrodes.

It should be noted that this version has an important speed advantage over the previous embodiments, where both capacitances 33 and 34 were discharged to ground before the refresh cycle started, since the capacitor, 33 or 34, which is to charge negatively after time $t_1$ has a smaller voltage difference to traverse. Another advantage, over the second embodiment is one less transistor, hence smaller circuit size and higher yields.

From this stage ($t_1$) onward, the cycle is essentially the same as previously described in connection with FIGS. 2 and 3. At $t_1$, the $\phi_A$ clock goes to ground for the remainder of the cycle, removing the short between nodes 1 and 2 and thus reisolating the load capacitances 33 and 34 as in the other embodiments. At $t_1$, the selected Y address bus ($Y_1$ in the example) is also energized (FIG. 7D), as in the previous embodiments FIG. 2B) to connect the selected memory capacitor 41 to node 1. As before, the combined capacitance 41 + 34 then races the capacitance 33 to more fully turn ON a selected one of the transistors 66 and 67, the only difference being that the race starts from the equalized just-over-threshold value $-V_X$ rather than from O volts as in the other embodiments.

Example I - Refresh a 1 on Capacitor 41

Specifically, in example I, where memory capacitor 41 starts at 0 volts at time $t_1$, the source $-V_1$ further charges the right capacitance 33 at a faster rate after $t_1$ because, on the left side, the charge is shared with the selected memory capacitor 41 starting at 0. In this case, the left transistor 67 turns fully ON, which grounds capacitances 41 and 34 on the left side and turns fully OFF the right transistor 66 and thereafter inhibits operation of that transistor for the remainder of the first cycle, $t_o$ to $t'_o$.

This example is illustrated in cycle I at the left of FIG. 7 (waveforms B and C), where capacitances 34 and 41 discharge rapidly to near ground potential through the ON transistor 67, as indicated by discharge curve 203 in FIG. 7B, while capacitance 33 is free to charge fully to $-V_N$ as indicated by charging curve 204 in FIG. 7C. By the time cycle time $t_2$ has been reached, the refresh operation has been completed, as in the previous example, and a steady-state situation has been reached, at which time ($t_2$ to $t'_o$) the read operation can be performed exactly as described previously.

Note that a right bank memory capacitor such as 43 or 44 in FIG. 3, if selected by bus $Y_{k+1}$ or $Y_{k+2}$ and if previously at 0 volts (binary 0), would be refreshed in exactly the same manner, but in reverse with the right transistor 66 ON and the combined capacitance of 33 and 43 or 44 selectively discharged through transistor 66 to ground.

Example II, write a 0 on Capacitor 41

This process is shown in cycle II of FIG. 7, and is essentially the same as that previously described in the section "write system". At time $t'_o$, a ground pulse (binary 0) is applied to data terminal 24 of the write amplifier 22, which is enabled by a "write" signal at terminal 23 to send the ground data signal to node 2 through the $X_1$ gating transistor $21_1$, which is turned ON (FIG. 7E) for the entire write cycle as previously described. Thus, at time $t'_o$ to $t'_1$ , the right load capacitance 33 discharges to ground of the 0 data signal (curve 210 FIG. 7C), at which time both capacitances 33 and 34 are at ground and both transistors 66 and 67 are fully OFF. Note, this grounding of both load capacitances 33 and 34 occurs only in a writing cycle where a zero is to be written and node 2 was charged in the previous cycle. At time $t'_o$ , the clock pulse $\phi_A$ turns the shorting transistor 200 ON, preventing the load transistor 78 from recharging node 1 negatively during $t'_o$ to $t'_1$.

At $t'_1$, $\phi_A$ returns to ground to remove the short between the nodes 1 and 2, and the selected memory capacitor 41 is again connected to node 1 when the $Y_1$ pulse activates the selected transistor 36. Prompty after $t'_1$, the source $-V_1$ charges the left side capacitances 41 and 34 in parallel through the load transistor 78 (curve 211, FIG. 7B) turning on transistor 66, while the right load capacitance 33 continues at essentially 0 volts (curve 212, FIG. 7C) since it is connected to the data input ground at terminal 24. Thus, the prior charge, if existing, on the selected cell capacitor 41 is overridden by the write pulse, and a 0 has been written in inverted form (by the sense-refresh amplifier $16_1$) on the capacitor 41, which is then isolated at time $t''_o$, as previously described, as the selected $Y_1$ bus returns to ground and the cell transistor 36 turns OFF.

Example III - Refresh a 0 on Capacitor 41

This process is essentially the same as described in connection with FIG. 3, except for the initial operation of the amplifier $16_1$ as described in Example I. In this example, at time $t''_o$, the $\phi_A$ clock pulse goes negative to equalize the charges on nodes 1 and 2 (capacitances 33 and 34), so that both move to $-V_X$ as previously described and as indicated by curves 221 and 222 in FIGS. 7B and C. Note that curves 221 and 222 are the reverse of 201 and 202 in cycle I, and that the charge $-V_X$ at the $t''_1$ corresponds exactly to the state at time $t_1$ in cycle I. However, in this example, at time $t_1$ when the clock $\phi_A$ returns to ground and the selected memory capacitor 41 is connected to node 1, the capacitor 41 is storing a $-V_M$ charge. This charge, added to the charge on capacitor 34 causes the race condition to end up with the right transistor 66 fully ON and the left transistor 67 fully OFF. Thus, the full $-V_M$ charge on the memory capacitor 41 is restored from the source $-V_1$ (curve 223) and the capacitance 33 is discharged to ground (curve 224) through transistor 66.

Another advantage to this system, as in the FIG. 4 embodiment, is that the clock $\phi_A$ functions only to turn ON and OFF a single transistor (200), whereby it draws it draws almost no current. Since the clock driver circuits are commonly fabricated on the integrated circuit chip, it is very advantageous to minimize the power insofar as possible. By comparison, recall that in the FIG. 3 example, the clock $\phi$ had to supply all the charging currents, whereas in FIG. 6 (and 4), the charging power comes from a fixed source, such as $-V_1$, which is located externally of the chip.

FURTHER SUMMARY AND EQUIVALENTS

In view of the foregoing description of the operation of three specific embodiments of the invention, it should be apparent that an extremely fast acting, random-access memory has been provided, using a single capacitance (such as 41) and access transistor (such as 36) for each memory cell 12, with a minimum of circuit components and power required, and with only a single pulse of a single-phase clock required for the operation of the memory system (other than address inputs).

One significant advantage, and saving in circuit components conductors, and integrated circuit real estate, resides in the use of the right half 17 of each I/O bus, such as $X_1$, for all external input and outputs to the memory ("write" amplifier 22 and "read" amplifier 27), and using the sense/refresh amplifiers such as $16_1$ as inverters to write on the left bank of cells and to reinvert upon read out from the left bank.

Thus, in essence, the left half 18 of each I/O bus, such as $X_1$, serves only as an input/output conductor or bus to connect any selected memory cell 12 in the left bank to node 1 of the amplifier $16_1$, but is otherwise not connected or connectable to any external circuits at its outer end. By contrast, the right half 17 of the I/O bus serves as an I/O conductor for the right bank of cells, connected at its inner end to node 2 of the inverter/amplifier 16, but is also connectable at its outer end (through the X-decoder gate or transistor $21_1$) to the external read and write circuits, which constitute the only data inputs to and outputs from the memory.

While various specific embodiments and examples of the invention have been described in detail above, it will be obvious that various modifications may be made from the specific details described, without departing from the spirit and scope of the invention. In particular, the preferred embodiment of the invention has been described using p-channel, enhancementmode transistors, wherein negative clock and data signals are utilized to turn ON the transistors to manipulate the data. Of course, other types of field-effect transistors are well known, using the inverse of such signals, or using positive and ground signals to operate the transistors, as well as complementary transistor systems using a mixture of P- and n-channel devices, for example. However, the principles of the invention remain the same.

Further details on the construction and operation of such field-effect transistor circuits, as well as examples of decoder circuits and gates which may be used in combination with this invention are described in my U.S. Pat. Nos. 3,596,108, 3,631,465, 3,618,050 with C. R. Winston, and my copending application "Dynamic Logic System", Ser. No. 822,520, filed May 7, 1969, all herein incorporated by reference.

What is claimed is:

1. An amplifier for sensing and refreshing charges stored in a plurality of memory capacitances comprising:

a pair of field-effect transistors, each having a control electrode and first and second terminals, cross-coupled so that the control electrode of each field-effect transistor is coupled to the first terminal of the other field-effect transistor, the second terminals of the field-effect transistors being coupled together;

first and second resistance coupled respectively to the first terminals of the pair of field-effect transistors;

first and second load capacitances of equal value coupled respectively to the first terminals of the pair of field-effect transistors;

means for coupling a selected one of the plurality of memory capacitances to a selected one of the first and second load capacitance so that the selected memory capacitance is added to the selected load capacitance thereby making the first and second load capacitances unequal; and means, coupled to the first and second resistance means, for charging the first and second load capacitances toward a predetermined charging potential so that the selected load capacitance will reach the predetermined potential first if the selected memory capacitance was initially charged and so that the remaining load capacitance will reach the predetermined potential first if the selected memory capacitance was not initially charged, the pair of cross-coupled field-effect transistors being switched by the load capacitance which first reaches the predetermined potential so that the remaining load capacitance is discharged to zero potential.

2. An amplifier in accordance with claim 1 wherein said first and second resistance means comprise first and second feld-effect transistors, each having a control electrode and first and second terminals, the second terminal of the first and second field-effect transistors being respectively coupled to the first terminals of said pair of field-effect transistors and the first terminals of the first and second field-effect transistors being coupled to said means for charging.

3. An amplifier in accordance with claim 2 wherein said means for charging further comprises a source of single-phase clock signals.

4. An amplifier for sensing and refreshing charges stored in a plurality of memory capacitances comprising:

a pair of field-effect transistors, each having a control electrode and first and second terminals, cross-coupled so that the control electrode of each field-effect transistor is coupled to the first terminal of the other field-effect transistor, the second terminals of the field-effect transistors being coupled together;

first and second load capacitances of equal value coupled respectively to the first terminals of the pair of field-effect transistors;

means for coupling a selected one of the plurality of memory capacitances to a selected one of the first and second load capacitances so that the selected memory capacitance is added to the selected load capacitance thereby making the first and second load capacitances unequal; and means, coupled to the pair of field-effect transistors, for charging the first and second load capacitances toward a predetermined charging potential so that the selected load capacitance will reach the predetermined potential first if the selected memory capacitance was initially charged and so that the remaining load capacitance will reach the predetermined potential first if the selected memory capacitance was not initally charged, the pair of cross-coupled field-effect transistors being switched by the load capacitance which first reaches the predetermined potential so that the remaining load capacitance is discharged to zero potential.

5. An amplifier in accordance with claim 4 wherein said means for charging further comprises:

a third field-effect transistor, having a control electrode and first and second terminals, the first and second terminals of the third field-effect transistor being coupled in parallel with the first and second terminals of one of the pair of field-effect transistors;

a fourth field-effect transistor, having a control electrode and first and second terminals, the first and second terminals of the fourth field-effect transistor being coupled in parallel with the first and second terminals of the remaining one of the pair of field-effect transistors; and a source of single-phase clock signals coupled to the control electrodes of the third and fourth field-effect transistors.

6. An amplifier in accordance with claim 5 wherein each of said field-effect transistors is of the MOSFET type with the control electrode and the first and second terminals thereof comprising gate, drain, and source electrodes.

7. A memory cell of the capacitive storage type comprising:

a field-effect transistor, having a control electrode and first and second terminals;

a plurality of address conductors, one of the plurality of address conductors being coupled to the control electrode of the field-effect transistor;

an input-output conductor coupled to the first terminal of the field-effect transistor; and a capacitance for storing charges having first and second electrodes, the first electrode being coupled to the second terminal of the field-effect transistor and the second electrode being coupled to a remaining one of the plurality of address conductors.

8. A memory cell in accordance with claim 7 wherein the field-effect transistor is of the MOSFET type and the first electrode of the capacitance is formed integrally with the second terminal of the field-effect transistor.

9. A memory cell in accordance with claim 7 wherein the second electrode of the capacitance is formed integrally with said remaining one of the plurality of address conductors.

10. A memory cell in accordance with claim 7 wherein the plurality of address conductors are parallel to each other and wherein the second terminal of the capacitance is coupled to one of the plurality of address conductors which is adjacent to the address conductor to which the control electrode of the field-effect transistor is coupled.

11. A memory cell of the capacitive storage type, comprising:

a capacitor;

an input/output conductor for the capacitor:

means for selectively connecting a first terminal of the capacitor to the input/output conductor;

at least two address conductors of the type where, when a first is energized, the second is invariably at ground potential, the first address conductor being coupled, when energized, to operate the connecting means so as to connect the first terminal of the capacitor to the input/output conductor, the second terminal of the capacitor being connected to the second address conductor so as to ground the second terminal of the capacitor whenever the connecting means is operated.

12. A memory circuit comprising a memory cell as recited in claim 11, and further comprising:

means connected to the input/output conductor during a writing cycle for selectively charging or discharging the cell capacitor as a function of binary data to be stored in the cell, so that the cell capacitor stores either (1) essentially ground potential or (2) a predetermined charge ($V_M$) of a given polarity at the end of the writing cycle.

13. A memory circuit as recited in claim 12:

wherein the charging or discharging means inverts an input data signal so that the cell capacitor stores the complement of the data signal;

further comprising read-out means selectively connectable to the charging or discharging means during a read cycle; and wherein the charging or discharging means also reinverts the data stored on the cell capacitor during the read cycle so that the output data is read out from the cell in its original form.

14. A circuit as recited in claim 13, wherein the charging or discharging means includes a sense/refresh amplifier having a first node connected to the input/output conductor and a second node selectively connectable to data read or write circuits, the data inputs and outputs being connectable only to the second node, the sense/refresh amplifier including means for inverting the input data signal applied at the second node during a read cycle so that the complement appears at the first node and is transmitted to the cell capacitor, and for reinverting at the second node a signal from the cell capacitor at the first node, and transmitting the re-inverted signal to the read circuit during the read cycle.

15. A memory circuit as recited in claim 12, and further including a circuit for periodically refreshing the signal on the cell capacitor, which comprises:

A. a pair of load capacitances of equal value, a first load capacitance being connected to the input/output conductor for the cell capacitor so that, when selected, the cell capacitor is connected in parallel with the first load capacitance at a time $t_1$;

B. means for bringing both load capacitances to a common initial potential prior to the time $t_1$;

C. means for connecting the load capacitances in parallel to a source of charging potential at the time $t_1$, the source being of the same polarity as said predetermined charge $V_M$ and of a higher magnitude than the initial potential so that both load capacitances tend to charge from the source at the same rate, the connection of the cell capacitor to the first load capacitance being such that 1. if the cell capacitor was previously at ground potential, the cell capacitor and first load capacitance charge in parallel from the source, and the second load capacitance thus charges at a faster rate, and 2. if the cell capacitor was previously charged to a voltage at or near $V_M$, the charge on the cell capacitor adds to the source potential to charge the first load capacitance at a faster rate; and D. means responsive to a differential charging rate between the first and second load capacitances for 1. discharging the cell capacitor to ground whenever the second load capacitance charges faster, thus refreshing the ground potential originally stored on the cell capacitor, and 2. allowing completion of the charge from the source to the cell capacitor whenever the first load capacitance charges faster, which charge is the desired predetermined charge $V_M$, thus refreshing the charge originally stored;

the selective connecting means (claim 11) operating to isolate the cell capacitor from the refresh circuit after the cell capacitor has been (1) fully discharged to ground or (2) fully charged from the source, and before a subsequent operation of the means (B).

16. In a memory circuit of the type where either (1) essentially ground potential or (2) a predetermined charge ($V_M$) of a given polarity is stored on a memory capacitor as a function of binary data, a circuit for refreshing the signal on the memory capacitor, which comprises:

A. a pair of load capacitances of equal value;

B. means for bringing both load capacitances to a common initial potential prior to a time $t_1$;

C. means for connecting the load capacitances in parallel to a source of charging potential at the time $t_1$, the source being of the same polarity as said predetermined charge $V_M$ and of a higher magnitude than the initial potential so that both load capacitances would tend to charge from the source at the same rate;

D. means for connecting the memory capacitor in parallel with a first one of the load capacitances at the time $t_1$ so that 1. if the memory capacitor was previously at ground potential, the memory capacitor and first load capacitance charge in parallel from the source, and the second load capacitance thus charges at a faster rate, and 2. if the memory capacitor was previously charged to a voltage at or near $V_M$, the charge on the memory capacitor adds to the source potential to charge the first load capacitance at a faster rate;

E. means responsive to a differential charging rate between the first and second load capacitances for 1. discharging the memory capacitor to ground whenever the second load capacitance charges faster, thus refreshing the ground potential originally stored on the memory capacitor, and 2. allowing completion of the charge from the source to the memory capacitor whenever the first load capacitance charges faster, which charge is the desired predetermined charge $V_M$, thus refreshing the charge originally stored; and F. means for isolating the memory capacitor from the refresh circuit after the memory has been (1) fully discharged to ground or (2) fully charged from the source, and before subsequent operation of the means (B).

17. A circuit as recited in claim 16, wherein means (B) comprises means for connecting both load capacitances to circuit ground prior to the time $t_1$, ground being the common initial potential, and for removing the ground after $t_1$.

18. A circuit as recited in claim 17, wherein the ground connecting means comprises:

a pair of load resistors connected to the respective load capacitances; and a source of clock pulses connected in parallel to the load resistors and timed so that the clock pulse is at 0 volts prior to time $t_1$ to provide the circuit ground from the clock signal.

19. A circuit as recited in claim 18, wherein means (C) of claim 16 includes the same load resistors and clock source recited in claim 18, the clock pulse being timed so that it switches to the charging potential at time $t_1$, the clock providing the charging potential required during the cycle for all of the capacitances.

20. A circuit as recited in claim 19, wherein the load resistors comprise a pair of continuously ON biased field-effect transistors, the transistors serving as load resistors (a) during charging of the load capacitances from the clock voltage after $t_1$, and (b) to ground the load capacitances to the clock ground prior to $t_1$.

21. A circuit as recited in claim 17, wherein the ground connecting means comprises:

a pair of gating devices having first terminals connected to the respective load capacitances and second terminals connected to circuit ground; and a source of clock pulses connected to the gates of the gating devices and timed so as to turn the gating devices ON prior to the time $t_1$ so as to connect load capacitances to circuit ground through the gating devices, and OFF at time $t_1$ so as to isolate the load capacitances from connection to ground through said gating devices.

22. A circuit as recited in claim 21, wherein means (C) of claim 16 comprises:

a pair of load resistors connected to the respective load capacitances; and a constantly ON source of charging potential connected to the load capacitances through the load resistors.

23. A circuit as recited in claim 22, wherein:

the load resistors comprise a pair of continuously ON biased field-effect transistors; and the gating devices comprise a further pair of field-effect transistors having first controlled terminals connected to the respective load capacitances, second controlled terminals connected to circuit ground, and gates coupled to the source of clock pulses.

24. A circuit as recited in claim 16, wherein means (B) comprises means for bringing both load capacitances to a common relatively low potential $V_X$ prior to the time $_1$, the relatively low potential being less than half of the magnitude of the source of charging potential, so that both load capacitances tend to charge further from $V_X$ toward the voltage of the source of charging potential after time $t_1$, when means (C) is actuated.

25. A circuit as recited in claim 24, wherein: means (E) of claim 16 is further arranged to discharge the slowest charging load capacitor to ground prior to the end of each cycle;

the means (B) of claim 24 comprises means for shorting the two load capacitances to each other at a time $t_0$ corresponding to the start of a cycle and before the next occurrence of time $t_1$, so as to equalize the charges on the load capacitances at $V_X$, and for removing the short at the time $t_1$ to re-isolate the load capacitances for separate charging from the source.

26. A circuit as recited in claim 25, wherein the means for connecting the load capacitances to each other comprises a gate, and a source of clock signals for turning ON the gate during the time period from $t_0$ to $t_1$.

27. A circuit as recited in claim 26, wherein the means (E) of claim 16 includes a pair of voltage sensitive gating means, each having a control element connected to a corresponding one of the load capacitances, and controlled terminals connected between the other load capacitance and circuit ground.

28. A circuit as recited in claim 16, wherein means (E) further comprises:

1. means for discharging both the memory capacitor and the first load capacitance to circuit ground whenever the second load capacitance charges faster, while permitting full charging of the second load capacitance from the source by a later cycle time $t_2$; and
2. means for discharging the second load capacitance to ground whenever the first load capacitance charges faster, while permitting full charging of the first load capacitance and the memory capacitor, in parallel, from the source by the time $t_2$.

29. A circuit as recited in claim 28, wherein means (1) of claim 28 precludes operation of means (2), and vice versa, so that only a selected one of the load capacitances is fully charged at time $t_2$, the one selected being governed by the charge initially stored on the memory capacitor.

30. A circuit as recited in claim 29, wherein the circuit ground to which said load capacitances and memory capacitor are selectively discharged is a fixed circuit ground.

31. A circuit as recited in claim 30, wherein means (1) and (2) of claim 28 comprise cross-coupled voltage-responsive gating devices arranged in a flip-flop configuration so that, when either one first turns ON, it thereafter precludes operation of the other one, the gating devices being connected to the respective load capacitances and being arranged to be turned ON by a predetermined threshold voltage being applied thereto by the prespective load capacitance so as to connect the opposite load capacitance to the circuit ground.

32. A memory circuit as recited in claim 28, further comprising:

means for reading the charge on the second load capacitance after tqme $t_2$, which charge is the complement of the charge on the memory capacitor at the time $t_2$, thus providing that the data is read out in inverted form from the memory capacitor selectively connected to the first load capacitance.

33. A memory circuit as recited in claim 32, further comprising means for initially storing a signal on the memory capacitor selectively connected to the first load capacitance, which stored signal is the complement of the data being written.

34. A memory circuit as recited in claim 33, wherein: there are provided an even numbered plurality of memory capacitors arranged in first and second banks having equal numbers of memory capacitors, the memory capacitors in the first bank being slectively and individually connectable by connecting means to the first load capacitance, the memory capacitors in the second bank being selectively and individually connectable by additional connecting means to the second load capacitance, the connecting means being arranged so that only one is actuated in any one cycle, the data stored on and read from the second bank of memory capacitors connected to the second load capacitance being stored and read in normal form, not in inverted form.

35. A memory circuit as recited in claim 34, wherein the means for selectively connecting the memory capacitors in parallel with the associated load capacitance comprises:

a first input/output conductor connected at one end to the first load capacitance and connectable to each of the memory capacitors in the first bank;

a second input/output conductor connected at one end to the second load capacitance, connectable to each of the memory capacitors in the second bank, and selectively connectable at its other end to the read and write circuits; and address means, including one address conductor associated with each memory capacitor, for connecting one and only one memory capacitor to the associated input/output conductor at the time $t_1$ and for disconnecting the memory capacitor from the input/output conductor at the end of each cycle, prior to the operation of means (B) of claim 16, so as to isolate the signal on the selected memory cell in preparation for further refresh and/or read cycles.

36. A circuit as recited in claim 35, wherein:

the address means is of the type when only one selected address conductor is energized in any one cycle to connect the associated memory capacitor to the corresponding input/output conductor, and all other address conductors are invariably at ground potential; and the terminal of each memory capacitor opposite to the corresponding input/output conductor is connected to an adjacent address conductor so as to provide ground potential on that terminal whenever that memory capacitor is selected.

37. A read/write memory circuit, comprising:

A. means for inverting data signals, having input/output nodes 1 and 2 on opposite sides thereof;

B. a first bank of memory cells disposed on a first side of the inverting means, each having a memory storage element;

C. a first I/O conductor connected at its inner end to node 1, for connecting the memory storage element of any selected cell in the first bank to node 1, the first I/O conductor being unconnectable to any external circuits at its outer end;

D. a second bank of memory cells equal in number to the first bank and disposed on the second side of the inverting means, each having a memory storage element;

E. a second I/O conductor connected at its inner end to node 2, for connecting the memory storage element of any selected cell in the second bank to node 2;

F. means for selectively connecting the outer end of only the second I/O conductor to external write or read circuits when it is desired to write a bit of data on the memory storage element of any selected cell in either bank, or to read out a data signal from any cell in either bank;

G. means for addressing any one selected cell in either bank, to connect the selected memory storage element to its associated I/O conductor;

H. the means for inverting being arranged so that:

1. to write on any memory cell in the first bank, the input data signal applied to node 2 is inverted and transmitted from node 1 to the selected cell in the first bank, where it is stored in inverted form on the selected storage element; and
2. to read out from any selected memory cell in the first bank, the inverted signal stored on the memory cell in the first bank is applied to node 1, reinverted by the inverting means at node 2, and then read out from node 2 in its normal form;

I. the data being written in normal form on the memory cells in the second bank, and being read out from node 2 in normal form.

38. A memory circuit as recited in claim 37, wherein the inverting means comprises a sense/refresh amplifier circuit, which also functions to refresh the signal stored on any selected memory cell in any cycle where a write operation is not selected.

39. A memory circuit as recited in claim 38, wherein a single phase clock is provided for operating the sense/refresh amplifier.

40. A memory circuit as recited in claim 39, wherein:

the memory storage elements memory capacitors capable of storing either (*b 1*) essentially ground potential, or (2) a predetermined charge ($V_M$) as a function of the binary data; and the sense/refresh amplifier comprises:

first and second load capacitances of equal value connected respectively to nodes 1 and 2;

means actuated by a first signal from the clock for bringing both load capacitances to a common initial potential between cycle times $t_o$ and $t_1$, the initial potential being less than half of a full cell charge $V_M$;

means actuated by a second signal from the clock for connecting the load capacitances in parallel to a source of charging potential of the same polarity as $V_M$ at time $t_1$, so that both load capacitances would tend to charge at the same rate toward the source potential;

means for connecting the selected memory capacitor to its associated node from time $t_1$ to the end of the cycle $t'_o$, so that the load capacitances charge at unequal rates depending on whether the selected memory capacitor has been storing 1. essentially ground potential, or (2) a voltage at or near $V_M$;

means for selectively connecting the write circuit to node 2 from prior to time $t_1$ to the end of the cycle data is to be written;

means for sensing which load capacitance is charging faster after time $t_1$ and for grounding the slower load capacitance and associated node and memory capacitor if connected, while permitting complete charging of the faster load capacitance and memory capacitor if connected by a cycle time $t_2$, at which time the data has been written or the signal on the selected memory capacitor has been refreshed whenever the write operation is not selected for that memory capacitor; and mean for selectively reading the signal on the second load capacitance after time $t_2$ and before $t'_o$ whenever a read operation is selected for the memory cell.

41. A memory circuit as recited in claim 40, further comprising:
a plurality of rows $X_l$ to $X_i$ of memory circuits as recited in claim 40, having their memory capacitors arranged in perpendicular columns $Y_l$ to $Y_j$, the second I/O conductors for each cell also comprising access conductors $X_1-X_i$;
a plurality of gating means for connecting only one selected row to either the read or the write circuits; and
a plurality of Y access conductors $Y_1$ to $Y_j$, selectively energizable to connect all memory capacitors in one selected column to their associated I/O conductors, all other Y access conductors except a selected one being at ground potential, so that each memory capacitor in the selected column is refreshed during each cycle, except for a memory capacitor in a selected row during a writing cycle.

42. A circuit as recited in claim 41, wherein each memory capacitor has its terminal opposite to the corresponding I/O conductor connected to an adjacent Y access conductor, so as to provide a common ground signal from the adjacent access conductor on that terminal of all memory capacitors in the selected column.

43. A memory as recited in claim 37, wherein:
the means for addressing includes a plurality of parallel address conductors, one associated with each cell and arranged so that only one selected address conductor is energized in a cycle to select a given memory cell, the remaining address conductors being at essentially ground potential; and
each memory element comprises a cell capacitor having a first terminal connectable by the addressing means to the corresponding I/O conductor and a second terminal connected to an adjacent address conductor.

44. In a memory system of the type where either (1) essentially ground potential or (2) a predetermined charge ($V_M$) of a given polarity is stored on a memory capacitor as a function of binary data, a method of refreshing the signal on the memory capacitor, which comprises:
A. bringing both load capacitances of a pair of load capacitances of equal value to a common initial potential prior to a time $t_1$;
B. connecting the load capacitances in parallel to a source of charging potential at the time $t_1$, the source being of the same polarity as said predetermined charge $V_M$ and of a higher magnitude than the initial potential so that both load capacitances would tend to charge from the source at the same rate;
C. connecting the memory capacitor in parallel with a first one of the load capacitances at the time $t_1$ so that
1. if the memory capacitor was previously at ground potential, the memory capacitor and first load capacitance charge in parallel from the source, and the second load capacitance thus charges at a faster rate, and
2. if the memory capacitor was previously charged to a voltage at or near $V_M$, the charge on the memory capacitor adds to the source potential to charge the first load capacitance at a faster rate;
D. discharging the memory capacitor to ground whenever the second load capacitance charges faster, thus refreshing the ground potential originally stored on the memory capacitor;
E. allowing completion of the charge from the source to the memory capacitor whenever the first load capacitance charges faster, which charge is the desired predetermined charge $V_M$, thus refreshing the charge originally stored; and
F. isolating the memory capacitor after it has been (1) fully discharged to ground or (2) fully charged from the source, and before a subsequent performance of step A.

45. The method as recited in claim 44, wherein steps (D) and (E) further comprise:
discharging the slowest charging load capacitance to ground by a later cycle time $t_2$, while permitting full charging of the faster charging load capacitance, and memory capacitor if connected to it, by the time $t_2$.

46. A method of operating a memory of the type recited in claim 45, which further comprises:
reading the charge on the second load capacitance after time $t_2$, which charge is the complement of the charge on the memory capacitor at the time $t_2$, thus providing that the data is read out in inverted form from the memory capacitor connected to the first load capacitance.

47. The method as recited in claim 46, further comprising the step of initially storing a signal on the memory capacitor connected to the first load capacitance, which stored signal is the complement of the data being written.

48. The method as recited in claim 47, for operating a random-access memory of the type having an even numbered array of memory capacitors of the same type, wherein:
memory capacitors in a first bank of capacitors are selectively and individually connected to the first load capacitance during selected cycles, and memory capacitors in a second, equal numbered bank are selectively and individually connected to the second load capacitance during other cycles, only one memory capacitor in the entire array being connected to the corresponding load capacitance in any one cycle, the data being stored on and read from the second bank of memory capacitors in normal form, not in inverted form.

49. A method of operating a memory of the type having first and second banks of memory cells of equal number in each bank, each cell having a memory storage element, which method comprises:
selectively connecting the memory storage element of any selected cell in the first bank to a first circuit node, or the memory storage element of any selected cell in the second bank to a second node, the first node being unconnectable to any external circuits;
selectively connecting the second node to external write or read circuits when it is desired to write a bit of data on the memory storage element of any selected cell in either bank, or to read out a bit from any cell in either bank;
inverting the signal between the first and second nodes so that:
1. to write on any memory cell in the first bank, the input data signal is applied to the second node, inverted and transmitted from the first node to the selected cell in the first bank, where it is stored in inverted form on the selected storage element; and 2. to read out a signal from any selected memory cell in the first bank, the inverted signal stored on the memory cell in the first bank is applied to the first node, re-inverted, and transmitted from the second node to the read out circuit in its normal form;

the data being written and read from the memory cells of the second bank in normal form.

50. A method as recited in claim 49, wherein the reading step is accomplished by sensing the state of a load capacitance connected to the second node after time $t_2$, the load capacitance bearing a signal which is the complement of that stored on a memory cell in the first bank if connected to the first node at time $t_2$, and the same as that stored on a memory cell in the second bank if connected to the second node at time 2.

* * * * *

Disclaimer 3,838,404.—*Richard H. Heeren*, Palatine, Ill. RANDOM ACCESS MEMORY SYSTEM AND CELL. Patent dated Sept. 24, 1974. Disclaimer filed June 27, 1977, by the assignee, *Teletype Corporation*.

Hereby enters this disclaimer to claims 16, 24 through 35, inclusive, 37 through 41, inclusive and 44 through 50, inclusive of said patent.

[*Official Gazette October 21, 1980.*]